UNITED STATES PATENT OFFICE.

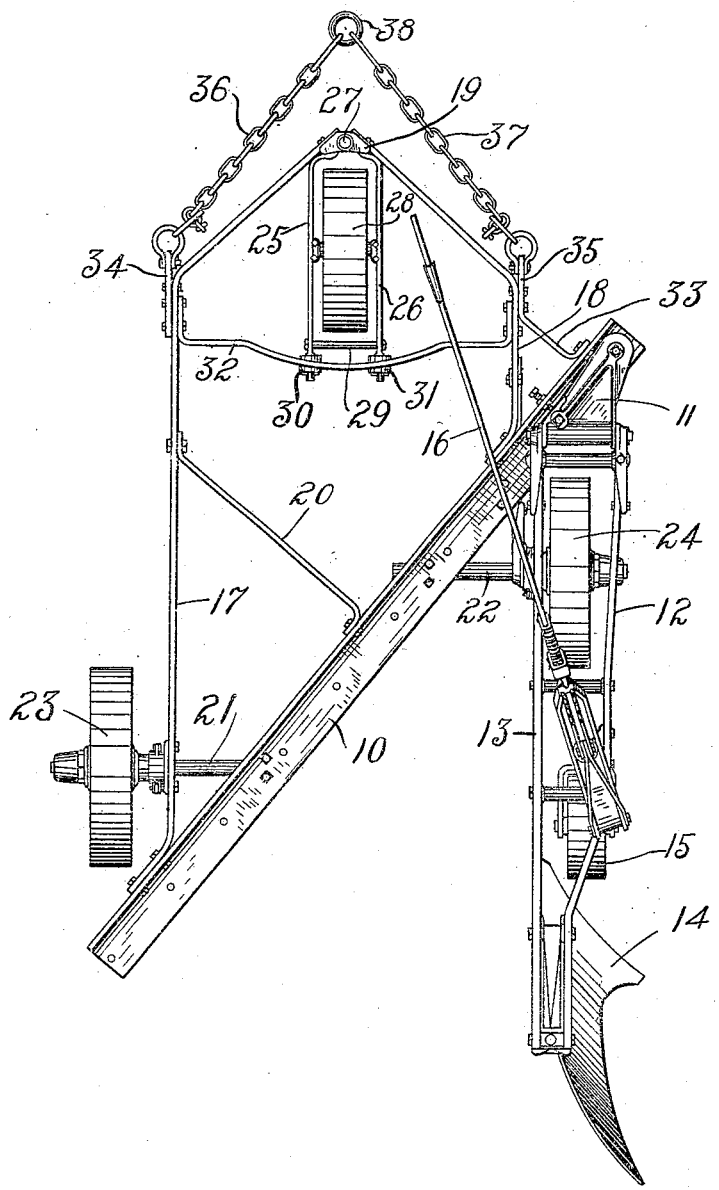

WILLIAM S. GRAHAM, OF CANTON, ILLINOIS, ASSIGNOR TO PARLIN AND ORENDORFF COMPANY, OF CANTON, ILLINOIS, A CORPORATION OF ILLINOIS.

GANG-PLOW.

992,496.  Specification of Letters Patent.  Patented May 16, 1911.

Application filed December 10, 1909. Serial No. 532,360.

*To all whom it may concern:*

Be it known that I, WILLIAM S. GRAHAM, a citizen of the United States, residing at Canton, in the county of Fulton, State of Illinois, have invented certain new and useful Improvements in Gang-Plows, of which the following is a specification, reference being had to the accompanying drawings.

My invention relates to gang plows of that class adapted to be drawn by a traction engine. It is sometimes desirable to have the engine farther to one side or the other relative to the plow than at other times, depending upon the width of the engine used, for example, or upon other conditions of the work, and provision must be made for this adjustment in the connections between the engine and the plow. This has been accomplished heretofore by connecting the plow to the engine by means of a pair of chains which converged toward their forward ends and were there connected to the engine, the chains being long enough so that when one chain was shortened more or less so as to shift the engine farther to that side of the plow the chains would still work satisfactorily. The result has been to place the platform of the plow at some little distance from the platform of the engine, so that the operator has not been able to step from one to the other without great inconvenience and danger to himself. On the other hand, in cases where both chains have been shortened up so as to bring the two platforms into convenient relation closer to each other, the necessary adjustability in the connection has been lacking.

It is the object of my invention to provide a new and improved construction of plow frame by reason of which, when such plow is connected up with an ordinary traction engine such as are now in common use, the platform of the plow may extend to within a very short distance of the platform of the engine so as to enable the operator to step easily and without danger from one to the other, at the same time maintaining the desired adjustability in such connection. I have accomplished this object by the means shown in the drawing and hereinafter specifically described.

That which I believe to be new will be set forth in the claims.

The drawing is a top or plan view of the frame of a gang-plow embodying my improvements with one plow-beam and its accompanying parts connected to the frame.

Referring to the drawing,—10 indicates the oblique bar of the plow to which the plow-beams are adapted to be connected, being preferably in the form of an angle-iron as shown. 11 indicates a bracket secured to said oblique bar 10 near one end thereof.

12—13 indicate two bars comprising the plow-beam pivotally connected at their front ends to the bracket 11, and connected at their rear ends to a plow 14 in any approved manner.

15 indicates a caster-wheel connected to the bar 12 and provided with a lever 16 by which it may be shifted up or down relative to said bar as desired.

The parts so far described are preferably of the form described and claimed in my application for Letters Patent on gang-plows, filed Nov. 1, 1909, Serial No. 525,720, and form no part of my present invention, and it is not believed to be necessary to describe them further in detail herein. It will, of course, be understood that any other desired form of plow and plow-beam may be employed if desired.

Coming now to the framework of the plow, 17—18 indicate two heavy bars connected at their rear ends by bolts, or in any other suitable manner, to the oblique bar 10 near the opposite ends thereof, said bars extending from the oblique bar 10 forward parallel with the line of the draft and being turned or bent so as to converge at their forward ends, which are suitably connected to a bracket 19.

20 indicates a heavy brace-bar extending obliquely from about the central portion of the bar 17 to about the center of the oblique bar 10, being suitably connected at its ends to said parts.

21—22 indicate axles suitably secured to the oblique bar 10 and to the bars 17—18, respectively.

23—24 indicate carrying-wheels journaled upon the axles 21—22, respectively.

25—26 indicate two bars connected at their forward ends in any suitable manner to a pin 27, which is journaled in the bracket 19. 28 indicates a wheel which is journaled between said bars 25—26 in any suitable manner.

29 indicates a brace-rod connecting the rear ends of the bars 25—26, and holding them firmly in position relative to each other.

30—31 indicate rollers journaled in the rear ends of the bars 25—26.

32 indicates a bar connected at its ends to the bars 17—18, with its central portion formed in the arc of a circle about the pin 27 so that the rollers 30—31 bear upon the lower edge of the arc shaped portion of the bar 32.

33 indicates a brace-bar connected at one end to the end of the oblique bar 10, and connected to the bar 18.

34—35 indicate hitch-irons connected to the bars 17—18 respectively, at the points where said bars 17—18 begin to converge, the hitch-iron 35 in the construction shown being integral with the brace-bar 33.

36—37 indicate flexible connections, shown in the form of chains, connected at their rear ends to the hitch-irons 34—35, respectively. They converge toward their forward ends, and are there connected to a hitch-ring 38.

It will be understood that in use a platform will be provided covering the framework of the plow, which may be secured thereto in any suitable manner, and it is not believed to be necessary to illustrate or describe this feature of the plow since it forms no part of the invention. Such platform, extending as it may to the forward end of the framework of the plow, would extend to within a short distance of the hitch-ring 38, which would ordinarily be attached to the engine a very little distance in the rear of the engine platform. In this way the platform of the plow is brought quite close to the engine platform, at the same time maintaining the chains 36—37 of sufficient length to insure the desired degree of adjustability in the connection between the engine and the plow.

What I claim as my invention and desire to secure by Letters Patent is,—

1. In a gang-plow, the combination with a frame comprising an oblique bar to which the plow-beams are adapted to be attached, a pair of bars one attached to said oblique bar near each end thereof, said last-named bars extending forward from said oblique bar parallel with the line of draft and being turned near their forward ends into convergence with one another, and a bracket connected to said bars at their forward ends, of a pair of flexible connections connected to said frame at about the point where said bars begin to converge.

2. In a gang-plow, the combination with a frame comprising an oblique bar to which the plow beams are adapted to be attached, a pair of bars one attached to said oblique bar near each end thereof, said last-named bars extending forward from said oblique bar parallel with the line of draft and being turned near their forward ends into convergence with one another, a bracket connected to said bars at their forward ends, and a caster-wheel journaled in said bracket, of a pair of flexible connections attached to said frame at about the point where said bars begin to converge.

3. In a gang plow, the combination with a frame whose sides converge toward the forward end, carrying wheels mounted thereon, a caster-wheel mounted in the forward end of said frame, and a plurality of plows mounted on said frame, of a pair of flexible connections attached to said frame in rear of the point of said frame and extending forward therefrom.

4. In a gang plow, the combination with a frame whose sides converge toward the forward end, a caster-wheel mounted in the forward end of said frame, an arc-shaped bar extending transversely of said frame, and anti-friction devices carried by said caster-wheel and adapted to engage said transverse bar, of a pair of flexible connections attached to said frame in rear of the point of said frame and extending forward therefrom.

5. In a gang-plow, the combination with a frame comprising an oblique bar to which the plow beams are adapted to be attached, a pair of bars one attached to said oblique bar near each end thereof, said last-named bars extending forward from said oblique bar parallel with the line of draft and being turned near their forward ends into convergence with one another, a bracket connected to said bars at their forward ends, a caster-wheel journaled in said bracket, an arc-shaped bar extending transversely of said frame, and anti-friction devices carried by said caster-wheel and adapted to engage said transverse bar, of a pair of flexible connections attached to said frame in rear of the point of said frame and extending forward therefrom.

WILLIAM S. GRAHAM.

Witnesses:
C. H. HASM,
W. C. FISHER.